(12) United States Patent
Wolf-Monheim

(10) Patent No.: US 10,882,369 B2
(45) Date of Patent: Jan. 5, 2021

(54) LONGITUDINAL LEAF SPRING DEVICE HAVING BUMP STOP UNIT

(71) Applicant: FORD GLOBAL TECHNOLOGIES, LLC, Dearborn, MI (US)

(72) Inventor: Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 16/164,165

(22) Filed: Oct. 18, 2018

(65) Prior Publication Data
US 2019/0118597 A1 Apr. 25, 2019

(30) Foreign Application Priority Data
Oct. 19, 2017 (DE) .......................... 10 2017 218 682

(51) Int. Cl.
*B60G 7/00* (2006.01)
*B60G 11/04* (2006.01)
*B60G 3/10* (2006.01)

(52) U.S. Cl.
CPC ............... *B60G 7/008* (2013.01); *B60G 3/10* (2013.01); *B60G 11/04* (2013.01); *B60G 2202/112* (2013.01); *B60G 2204/45* (2013.01); *B60G 2206/7101* (2013.01)

(58) Field of Classification Search
CPC .......... B60G 7/008; B60G 11/04; B60G 3/10; B60G 2202/112; B60G 2204/45; B60G 2206/7101; B60G 11/10; B60G 11/02
See application file for complete search history.

(56) References Cited

U.S. PATENT DOCUMENTS

| 2,405,458 | A | * | 8/1946 | Slack | B60G 7/005 |
| | | | | | 280/86.756 |
| 2,701,713 | A | * | 2/1955 | Tea | B60G 11/04 |
| | | | | | 267/229 |
| 2,735,673 | A | * | 2/1956 | Muller | F16F 1/30 |
| | | | | | 267/292 |
| 2,825,578 | A | * | 3/1958 | Walker | B60G 17/023 |
| | | | | | 280/124.102 |
| 2,969,230 | A | * | 1/1961 | Scheublein, Jr. | F16F 1/22 |
| | | | | | 267/233 |
| 2,973,952 | A | * | 3/1961 | Heintzelman | B60G 7/04 |
| | | | | | 267/30 |
| 3,069,149 | A | * | 12/1962 | Neff | B60G 7/04 |
| | | | | | 267/33 |
| 3,083,059 | A | * | 3/1963 | Biszantz | B60G 17/005 |
| | | | | | 298/17 S |

(Continued)

*Primary Examiner* — Timothy Wilhelm
(74) *Attorney, Agent, or Firm* — Brooks Kushman P.C.; Raymond L. Coppiellie

(57) ABSTRACT

A longitudinal leaf spring device for the suspension of a body of a motor vehicle has a leaf spring unit in an elongated form, a coupling device for the mechanical coupling of the leaf spring unit to a motor vehicle axle and at least one bump stop unit having two separate elastic stop elements which can be connected, in a manner arranged vertically above one another, to a chassis or to the axle. According to the invention, perpendicular directions to a downwardly directed mean contact area of the upper stop element and to an upwardly directed mean contact area of the lower stop element each form an angle other than zero with the vertical.

18 Claims, 2 Drawing Sheets

(56) References Cited

U.S. PATENT DOCUMENTS

| | | | | |
|---|---|---|---|---|
| 3,086,792 A * | 4/1963 | Schultz | B60G 11/16 | 280/124.142 |
| 3,120,952 A * | 2/1964 | Hendrickson | B60G 11/22 | 267/258 |
| 3,137,488 A * | 6/1964 | Toyer | B60G 7/04 | 267/269 |
| 3,462,169 A * | 8/1969 | Carter | B60G 11/44 | 280/6.16 |
| 3,799,571 A * | 3/1974 | Sudberry | B60G 11/04 | 280/124.174 |
| 3,850,444 A * | 11/1974 | Wright | B60G 7/04 | 280/124.165 |
| 4,468,014 A * | 8/1984 | Strong | F16F 1/368 | 188/268 |
| 4,671,535 A * | 6/1987 | Hanson | B60G 21/05 | 267/259 |
| 4,690,428 A * | 9/1987 | Fluegge | B60G 11/16 | 267/292 |
| 4,796,910 A * | 1/1989 | Starr, Sr. | B60G 7/04 | 267/30 |
| 4,988,080 A * | 1/1991 | Shah | B60G 7/04 | 267/30 |
| 5,024,462 A * | 6/1991 | Assh | B60G 5/047 | 267/241 |
| 5,172,930 A * | 12/1992 | Boye | B60G 11/04 | 280/124.102 |
| 5,509,684 A * | 4/1996 | Yarrow | B60G 7/001 | 267/260 |
| 5,857,687 A * | 1/1999 | Ishii | B60G 9/00 | 267/140 |
| 6,086,076 A * | 7/2000 | Prem | B60G 21/0551 | 280/124.111 |
| 6,257,597 B1 * | 7/2001 | Galazin | B60G 9/003 | 280/124.116 |
| 6,302,419 B1 * | 10/2001 | Ito | B60G 9/02 | 280/124.111 |
| 6,371,466 B1 * | 4/2002 | Spears | B60G 7/04 | 267/265 |
| 6,478,102 B1 * | 11/2002 | Puterbaugh | B60G 99/004 | 180/89.12 |
| 6,733,023 B2 * | 5/2004 | Remmert | B60G 11/16 | 267/179 |
| 6,820,883 B2 * | 11/2004 | Lang | B60G 7/04 | 267/220 |
| 7,017,888 B2 * | 3/2006 | Platner | B60G 7/04 | 267/27 |
| 7,387,307 B2 * | 6/2008 | Tanaka | B60G 3/202 | 280/124.135 |
| 8,276,894 B2 * | 10/2012 | Dickson | B60G 11/52 | 267/116 |
| 8,632,078 B2 * | 1/2014 | Ehrlich | B60G 11/08 | 280/124.17 |
| 8,720,921 B1 * | 5/2014 | Lamberti | B60G 11/38 | 267/153 |
| 8,801,018 B2 * | 8/2014 | Del Pup | B60G 7/001 | 267/30 |
| 9,050,873 B2 * | 6/2015 | Dilworth | B60G 11/04 | |
| 9,174,507 B2 * | 11/2015 | Soles | B60G 11/42 | |
| 9,193,238 B2 * | 11/2015 | Al-Dahhan | B60G 11/22 | |
| 9,610,820 B1 * | 4/2017 | Chen | B60G 3/18 | |
| 2008/0290572 A1 * | 11/2008 | Desprez | F16F 1/126 | 267/178 |
| 2014/0117640 A1 * | 5/2014 | Lamberti | F16F 3/0873 | 280/124.164 |
| 2015/0145187 A1 | 5/2015 | Soles et al. | | |
| 2019/0023095 A1 * | 1/2019 | Ficca | B60W 30/025 | |

* cited by examiner

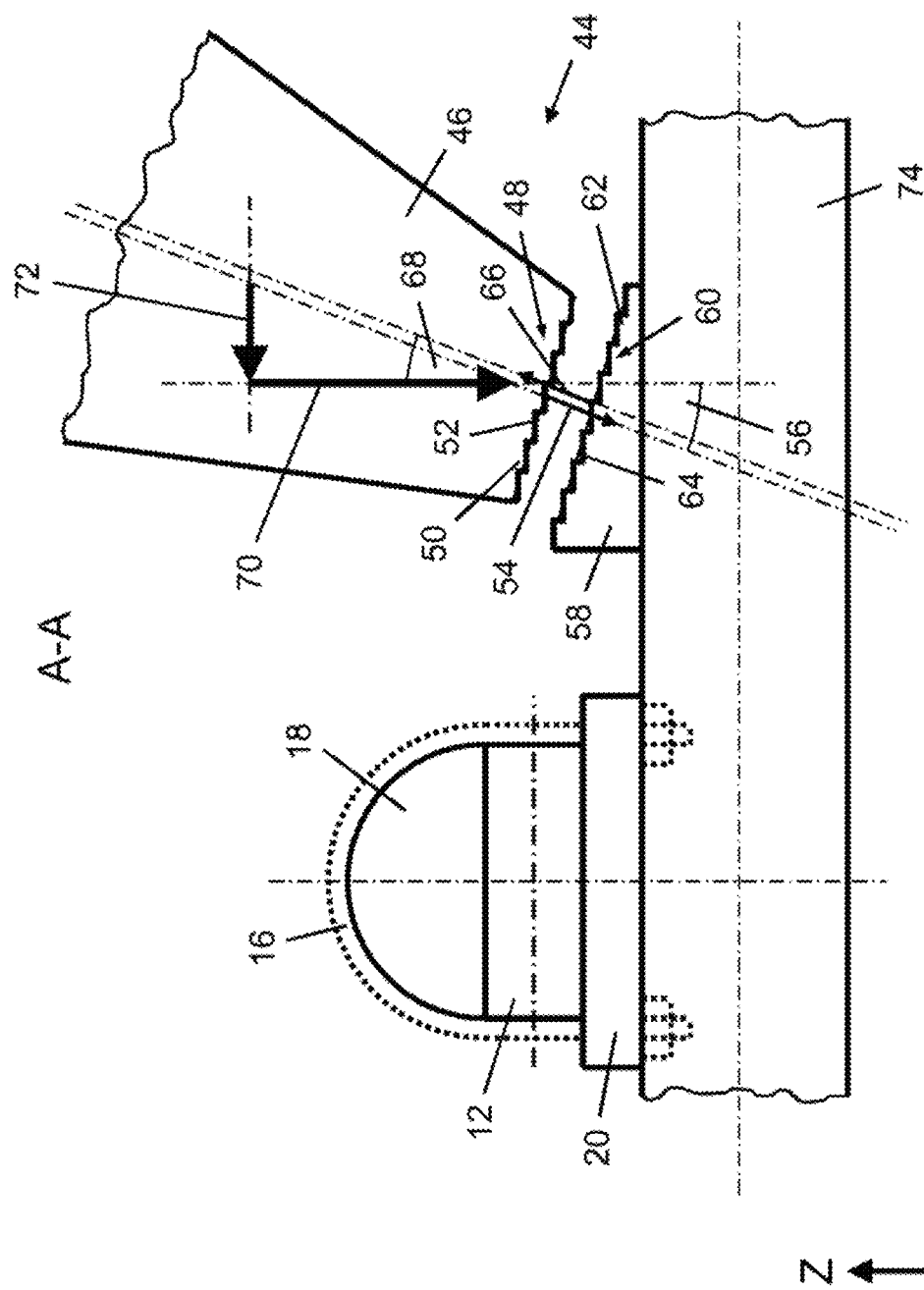

LONGITUDINAL LEAF SPRING DEVICE HAVING BUMP STOP UNIT

CROSS-REFERENCE TO RELATED APPLICATIONS

This application claims foreign priority benefits under 35 U.S.C. § 119(a)-(d) to DE Application 10 2017 218 682.8 filed Oct. 19, 2017, which is hereby incorporated by reference in its entirety.

TECHNICAL FIELD

Various embodiments relate to a longitudinal leaf spring device for the suspension of a body of a motor vehicle with a leaf spring element in an elongated form, a coupling device for the mechanical coupling of the leaf spring element to a motor vehicle axle and a bump stop unit having two separate elastic stop elements arranged vertically above one another.

BACKGROUND

Within the area of motor vehicle technology, it is known to insert elastic spring elements between a body of a motor vehicle as a sprung object and wheels of the vehicle as unsprung objects so that the traveling comfort of vehicle occupants is increased in that shocks caused by uneven ground are not transferred directly to the body. Furthermore, ground contact of the wheels, which is required for the force transfer, can also be ensured when the ground is uneven. Vibrations of the body which are excited by uneven ground are damped in a known manner by the use of shock absorbers which are arranged between the body and the wheel axles. In this case, the elastic spring elements can be formed for example by elastic helical springs and can be an integral component of the shock absorbers.

Within the area of the suspension of motor vehicles, the use of longitudinal leaf spring arrangements is furthermore known. A leaf spring of a longitudinal leaf spring arrangement is generally formed as a curved elongated rod, for example made from steel, with a rectangular cross-section and is arranged in the vehicle with its direction of extent in a vertical plane aligned parallel to a direction of extent of the vehicle. Furthermore, the leaf spring arrangement can be fastened to a vehicle axle by its central region and each of its ends can be fastened to a vehicle chassis.

For the suspension of motor vehicles, a progressive characteristic of the springs used is desirable to provide high traveling comfort in the case of a normal load and to be able to prevent a deflection of the suspension up to an end stop in the case of a high load, for example in the case of an uneven roadway or a high weight-loading, so that potholes do not "penetrate through" to the vehicle chassis. To achieve a progressive spring characteristic, various solutions have been proposed in the prior art, for instance the use of elastic bump stops.

For example, U.S. Pat. No. 2,701,713 A discloses a rear wheel suspension having a bump stop for a motor vehicle with a frame and a rear axle, comprising a rigid tubular torque arm; a mount, which is arranged near to the frame at the front end of the torque arm; a joint pin, which extends through the mount and the sleeve at the front end of the torque arm to pivotally connect the torque arm to the frame for a pivotal movement about a horizontally extending axis running in the transverse direction; a downwardly facing channel-shaped end extension, which is integrally formed at the rear end of the tubular torque arm, wherein the end extension has an open rear end; a self-supporting leaf spring having a main leaf spring and a plurality of adjacently arranged auxiliary leaf springs whereof the front ends all project into the open rear end of the channel-shaped end portion of the torque arm and are received in the downwardly facing channel portion and are encompassed by this; vertically aligned openings through the front ends of the leaf springs and through the upper wall of the channel-shaped end portion of the torque arm; pins which extend through the openings to fasten the self-supporting leaf spring on the torque arm; a spring bracket which pivotally connects the rear end of the main spring leaf to the rear part of the vehicle frame; upper and lower mounting plates on opposite sides of the rear end portion of the torque arm, wherein the upper mounting plate supports the rear axle; and U-bolts which clamp the rear axle and the mounting plates to the rear end portion of the torque arm to restrict a movement of the rear axle to an arc about the horizontal transverse axis at which the front end of the torque arm is connected to the vehicle frame. An axle buffer is fastened to an underside of the vehicle frame and above the rear axle to move into indirect contact with the rear axle, via an axle tube, in the event of an excessive vertical axle movement.

A longitudinal leaf spring arrangement which is intended to even enable an overload of a road vehicle with adequate ground clearance is described in U.S. Pat. No. 3,799,571 A. The longitudinal leaf spring arrangement comprises an overload spring in the form of a leaf spring, which is used in combination with a multi-leaf semi-elliptical spring pack, which is in turn intended to support the load of the axle of a road vehicle above the spring pack. The overload spring is likewise designed to be substantially semi-elliptical, with a convexity which is formed half way between the ends to enable the elliptical portion to cooperate with the main leaf spring of the spring pack and the convexity to be able to extend over the axle. Means are provided on the axle to prevent the convexity closing when the leaf springs curve and bend. The convexity has two parallel portions, which are connected by a linear portion, and the vehicle has a shock absorber made from rubber, which is fastened to the underside of the chassis, directly above the axle, so that the shock absorber moves into mechanical contact with the linear portion in overload conditions.

An auxiliary suspension system for a motor vehicle, in particular for a trailer-truck (articulated vehicle), is furthermore described in U.S. Pat. No. 4,796,910, which serves both to supplement and protect the trailer springs and also to prevent the trailer dropping directly onto the tires of the motor vehicle should one of the trailer springs break. A thick rubber pad is fastened to a plate on the underside of the undercarriage of the trailer. The spring is positioned on the auxiliary frame, above U-bolts which hold the trailer springs. When the trailer is not loaded, the rubber pad projecting downward from the underside of the undercarriage will normally be arranged at a spacing of several centimeters above the upper side of the U-bolt. When the motor vehicle is carrying a full load, the rubber pad is normally supported on the upper side of the U-bolt. In the event that the trailer springs break during operation of the motor vehicle, the rubber pad supports the trailer sub-frame on the U-bolt and prevents the sub-frame dropping directly onto the tires. The motor vehicle is therefore intended to also be movable with the broken trailer springs and to be drivable to a repair shop.

To achieve a non-linear progressive spring characteristic of a vehicle suspension, it has been proposed in the prior art to also use elements made from rubber or other materials with rubber-elastic properties, since these inherently have a non-linear spring characteristic.

For example, U.S. Pat. No. 9,050,873 B2 describes suspension systems, leaf springs and methods for providing a leaf spring in a suspension system of a vehicle. The suspension systems, the leaf springs and the methods for providing a leaf spring in a suspension system enable the use of a lighter leaf spring, whilst a customized roll stiffness and a vertical spring characteristic are provided, which are supplemented by a buffer which moves into engagement with the leaf spring arrangement when this latter is compressed to at least a predetermined position. The buffer contains an elastic element, which can be manufactured from microcellular polyurethane or another foam material which absorbs energy. The buffer is connected to an axle coupling arrangement for coupling the axle and leaf spring or to a vehicle frame of the vehicle and arranged in such a way that a center of the elastic element is arranged in the forward direction and inward of a center of the axle coupling arrangement.

US 2014/0117640 A1 describes a vehicle suspension improvement device, which comprises a pair of vertically aligned suspension elements, wherein one suspension element is mounted on the axle and the other suspension element is mounted on the vehicle frame. The suspension elements are preferably made of cellular polyurethane elastomer foam, but other non-metal materials, such as synthetic rubber, for example chloroprene rubber (NEOPRENE) and polyester urethane rubber (VULKOLLAN) can also be used. Each vehicle axle can be equipped with two vehicle suspension improvement devices, wherein a respective vehicle suspension improvement device is arranged on each side of an axle. Each of the spring elements is arranged in the space between the axle and the vehicle frame, wherein the ends of each spring element which are remote from the axle or the vehicle frame are facing one another and a space between these ends defines a gap. The gap between the mutually facing ends of the suspension elements will increase in response to an increase in the spacing between the frame and the axle.

In light of the demonstrated prior art, the area of vehicle wheel suspensions having longitudinal leaf spring devices still offers room for improvements.

SUMMARY

Various embodiments according to the present disclosure are based on the object of providing a longitudinal leaf spring device for the suspension of a body of a motor vehicle, which has improved properties with regard to a transverse stability.

According to an embodiment, a longitudinal leaf spring device for the suspension of a body of a motor vehicle. The spring device is provided with a leaf spring unit in an elongated form, and a coupling device for the mechanical coupling of the leaf spring unit to an axle of a motor vehicle. At least one bump stop unit is provided with two separate elastic stop elements connected, in a manner arranged vertically above one another, to a chassis or to the axle. Perpendicular directions to a downwardly directed mean contact area of the upper stop element and to an upwardly directed mean contact area of the lower stop element each form an angle other than zero with the vertical.

According to another embodiment, a motor vehicle is provided with at least one pair of leaf spring devices according to the present disclosure, the leaf spring devices being coupled to an axle of the motor vehicle, with the upper stop elements connected to a chassis of the motor vehicle and the lower stop elements connected to the axle.

It should be pointed out that the features and measures specified individually in the description below can be combined with one another in any technically useful manner and demonstrate further embodiments of the invention. The description additionally characterizes and specifies the invention in particular in conjunction with the figures.

According to an embodiment, a longitudinal leaf spring device for the suspension of a body of a motor vehicle is provided with a leaf spring unit in an elongated form, a coupling device for the mechanical coupling of the leaf spring unit to an axle of a motor vehicle and at least one bump stop unit having two separate elastic stop elements which can be connected, in a manner arranged vertically above one another, to a chassis or to the axle.

According to various embodiments, it is proposed that perpendicular directions to a downwardly directed mean contact area of the upper stop element and to an upwardly directed mean contact area of the lower stop element each form an angle other than zero with the vertical.

Within the context of this disclosure, "longitudinal leaf spring device" refers in particular to a leaf spring device having at least one leaf spring, which, in an installed state, is arranged in a plane which is aligned perpendicular to the axle of the motor vehicle.

Within the context of this disclosure, "motor vehicle" refers in particular to an automobile, a truck, a transporter, a tractor or a bus.

Within the context of this disclosure, "arranged vertically above one another" means in particular that the upper stop element and the lower stop element overlap at least partially in the vertical direction.

Within the context of this disclosure, "mean contact area" refers in particular to a planar virtual compensating area, which is defined in that deviations from the real contact area (simply "contact area" below) are minimized by the planar virtual compensating area, for example in the sense of a minimum sum of the squared deviations.

Within the context of this disclosure, "perpendicular direction to a mean contact area" refers in particular to a direction which, starting from a center point of the mean contact area, is arranged perpendicularly to this latter.

As a result of the contact area of the upper stop element and the contact area of the lower stop element respectively forming an angle other than zero, a laterally acting transverse force may be transferred in suspension situations in which the upper stop element and the lower stop element move into mutual contact. The cause of a laterally acting transverse force may be, for example, the accelerating force acting on the body of the motor vehicle during cornering. The transverse stability of the motor vehicle may be increased owing to the transfer of the laterally acting transverse force.

The leaf spring unit may be provided with one or more leaf springs which are manufactured, for example, from steel.

In various embodiments, longitudinal leaf spring devices may be provided with a leaf spring element which is manufactured predominantly from a composite material.

Within the context of the invention, the term "predominantly" refers in particular to a proportion of greater than 50 vol %, preferably greater than 70 vol % and, particularly preferably, greater than 90 vol %. In particular, the term is intended to include the capacity for the leaf spring element to be made entirely, i.e. 100%, from the composite material.

The composite material may be formed for example as a fiber-plastic composite (FPC). In particular, the composite material can comprise the composite material carbon fiber reinforced plastic (CFRP), glass fiber reinforced plastic (GFRP) and/or aramid fiber reinforced plastic (AFRP).

In embodiments of the longitudinal leaf spring device, in a state in which the longitudinal leaf spring device is only loaded by the body load, the stop elements form a vertical clearance of a predetermined size. In this case, a lower load range of the vehicle suspension can be specified, up to the upper limit of which the contact areas of the stop elements do not move into mutual contact and do not have an effect on the driving behavior of the motor vehicle, which means that greater traveling comfort can be achieved in the lower load range.

The angles formed by the perpendicular directions to the mean contact area of the upper stop element and to the mean contact area of the lower stop element with the vertical are within a range of angles between 10° and 40°. In this case, the angle formed by the perpendicular direction to the mean contact area of the lower stop element is directed inward and that formed by the perpendicular direction to the mean contact area of the upper stop element is directed outward. Lateral transverse forces occurring in driving situations can thus be transferred particularly effectively.

If the angle formed by the perpendicular direction to the mean contact area of the upper stop element with the vertical substantially corresponds, in terms of its value, to the angle which is formed by the perpendicular direction to the mean contact area of the lower stop element with the vertical, the upper stop element and the lower stop element can move into mutual contact, in a particularly extensive manner, in predetermined suspension situations. The lateral transverse forces can then be transferred with particularly low surface pressure and therefore in a manner which is gentle on materials and involves little wear.

Within the context of this disclosure, "substantially" means in a maximum difference in the values of the relevant angles of less than 20°, less than 15°, or less than 10°.

In various embodiments, at least one of the two separate stop elements comprises a rubber-elastic material, at least in a region of the mutually facing contact areas. Rubber-elastic materials inherently have a non-linear spring characteristic, which means that the bump stop units contribute to a desired non-linear progressive suspension in driving situations in which the stop elements are in mutual contact.

The bump stop unit is preferably arranged inwardly spaced from the coupling device, at least in the lateral direction. A compact arrangement of the bump stop unit and the coupling device with a low installation height requirement is thus be achieved.

If the contact area of the upper stop element and the contact area of the lower stop element form a friction pair with a coefficient of static friction of at least 0.8, a sliding movement between the contact areas can be substantially prevented and lateral transverse forces which occur can be particularly effectively transferred. The coefficient of static friction is preferably at least 1.0 and, particularly preferably, at least 1.2.

In various embodiments, the contact area of the upper stop element and the contact area of the lower stop element have mutually corresponding form-locking elements. A sliding movement between the contact areas in driving situations in which lateral forces occur between the stop elements may thus be substantially prevented and the lateral transverse forces can be reliably transferred.

The mutually corresponding form-locking elements may be formed in the shape of mutually matching series of stairs whereof the steps are aligned horizontally in at least one operating state of the longitudinal leaf spring device, with front edges of the steps extend transversely to the axle. In suspension situations in which the upper stop element and the lower stop element move into mutual contact, the stop elements can thus mesh with one another and form a particularly reliable form-locking connection for preventing a sliding movement between the contact areas.

In a further aspect of the embodiments, a motor vehicle is provided, which is equipped with at least one pair of longitudinal leaf spring devices according to the disclosure, which are coupled to an axle of the motor vehicle. In this case, the upper stop elements are connected to a chassis of the motor vehicle and the lower stop elements are connected to the axle.

DETAILED DESCRIPTION

Figure 1:
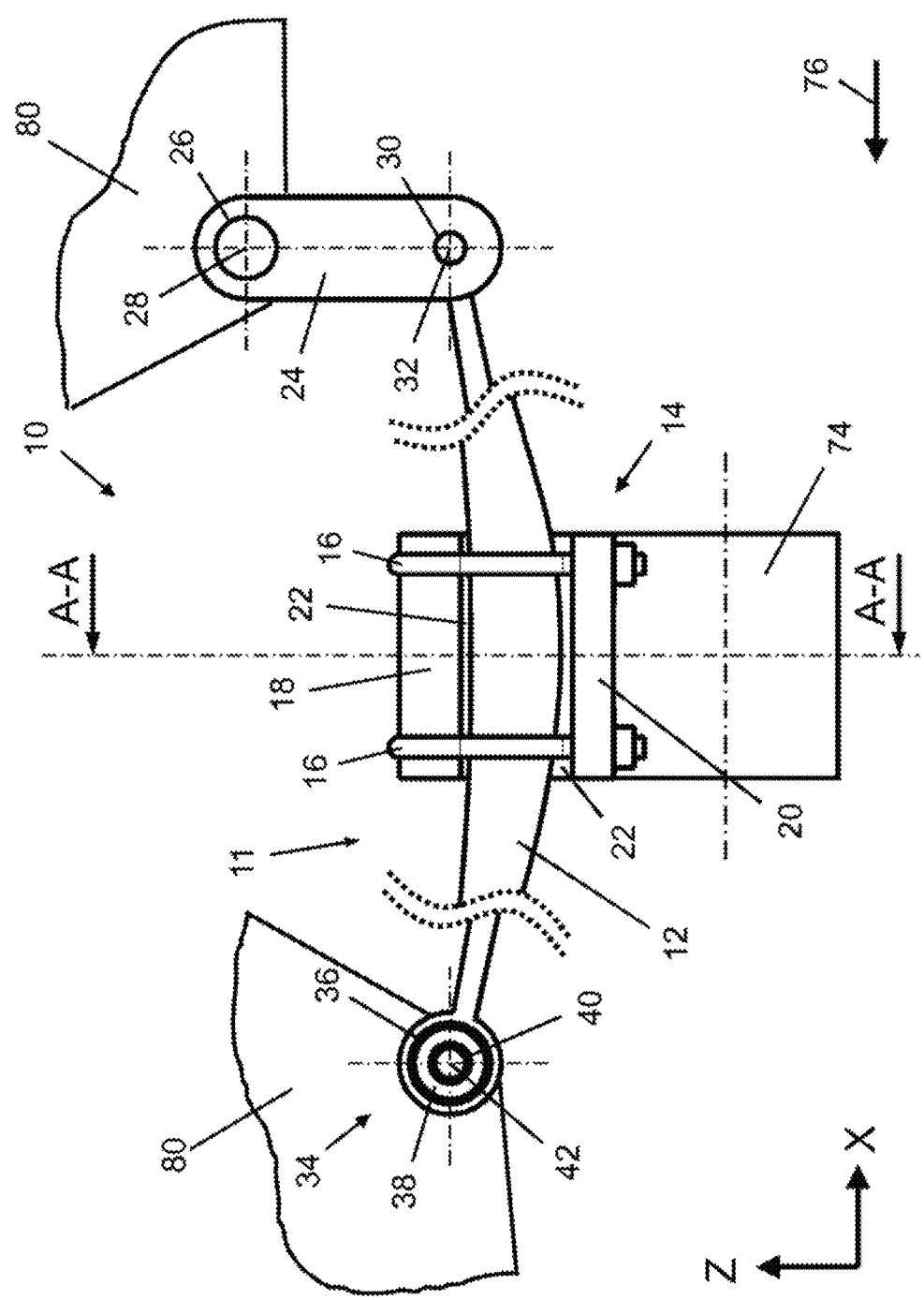
FIG. 1 a schematic illustration of a longitudinal leaf spring device coupled to an axle of a motor vehicle, in a side view, and FIG. 2 a schematic rear view of the longitudinal leaf spring device according to FIG. 1, shown in section along a plane which is transverse to the axle of the motor vehicle.

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the different figures, parts that are the same or similar to one another are denoted by the same reference numbers, and are generally also only described once in the description below.

FIG. 1 shows a schematic illustration of a possible embodiment of a longitudinal leaf spring device 10, coupled to the left side of an axle 74 of a motor vehicle, in a side view. The longitudinal leaf spring device 10 serves for the suspension of a body of the motor vehicle which is designed as a truck or transporter. The axle 74 is formed by a rigid rear axle of the motor vehicle. An inversely constructed longitudinal leaf spring device is provided symmetrically on the right side of the axle 74 of the motor vehicle.

The longitudinal leaf spring device 10 contains a leaf spring unit 11 in an elongated form, having a leaf spring element 12 of which a predominant proportion of greater than 95 vol % is made of a composite material, namely a fiber-plastic composite. The fiber-plastic composite is formed as a carbon fiber reinforced epoxy resin (CFREP). In the installed state illustrated in FIG. 1, the leaf spring element 12 in elongated form is located in a plane (XZ plane) which is arranged perpendicularly to the axle 74 of the motor vehicle and corresponds to the plane of the drawing. In this case, a direction of extent of the leaf spring element 12 is arranged substantially parallel to a (forward) direction of travel 76 of the motor vehicle, which extends from right to left (−X-direction) in FIG. 1. The leaf spring element 12 has a substantially rectangular cross-section which varies along the direction of extent to achieve a predetermined spring characteristic of the leaf spring element 12.

The longitudinal leaf spring device 10 furthermore has a coupling device 14 for mechanically coupling the leaf spring element 12 to the axle 74 of the motor vehicle. The coupling device 14 has a pair of U-bolts 16 made of steel, which are arranged at a spacing in the (forward) direction of travel 76, and with the U-shaped part aligned upward, and encompass the leaf spring element 12 in its central region. An upper transition element 18 of the coupling device 14 for adapting to the leaf spring element 12 is arranged between the leaf spring element 12 and the U-shaped part of the U-bolts 16 and a lower transition element 20 of the coupling device 14 for adapting to the axle 74 is arranged between the leaf spring element 12 and the open part of the U-shape of the U-bolts 16. The upper transition element 18 and the lower transition element 20 are made of steel. The U-bolts 16 penetrate through through-bores in the lower transition element 20 and are secured by screw nuts.

The coupling device 14 furthermore contains an acoustic separating element 22 which is formed as an elastomer molded part and is adapted to inner surfaces, facing the leaf spring element 12, of the upper transition element 18 or the lower transition element 20 and to outer contours of the leaf spring element 12 in the region of the coupling device 14. The acoustic separating element 22 serves for the acoustic decoupling of the leaf spring element 12 from the coupling device 14 during the operation of the longitudinal leaf spring device 10. In the present embodiment, the acoustic separating element 22 is formed as an individual elastomer molded part. In alternative embodiments, the acoustic separating element can also be formed by two separate elastomer molded parts, which are arranged between the upper transition element 18 and the leaf spring element 12 and/or between the lower transition element 20 and the leaf spring element 12.

The motor vehicle is equipped with a retaining bracket 24, which, in a position arranged above the rear end of the leaf spring element 12, is connected to the chassis 80 of the motor vehicle, which is formed for example as a ladder frame, and extends downward. The retaining bracket 24 is equipped with cylindrical plain bearing bushes 26, 30 made from metal, which are spaced in the vertical direction (Z direction). A cylindrical pin, which is fixedly connected to the chassis 80 of the motor vehicle so that the retaining bracket 24 is pivotable about an upper transverse axis 28 relative to the chassis, is guided through the upper plain bearing bush 26.

A rear end of the leaf spring element 12, as seen in the direction of travel 76, is formed as an eye. A cylindrical metal pin is guided through the eye. Both ends of the metal pin are guided through two lower plain bearing bushes 30 made from metal, which are arranged at the same height in the retaining bracket 24, so that the rear end of the leaf spring element 12 is pivotable about a lower transverse axis 32 relative to the retaining bracket 24. A filling made from rubber (not illustrated) between the plain bearing bushes 26, 30 and the cylindrical metal pin is provided for reducing a noise development during the operation of the longitudinal leaf spring device 10.

A front end of the leaf spring element 12 is formed as a circular eye, which completely surrounds an outer metal hollow cylinder 36 of a front plain bearing bush 34. An inner metal hollow cylinder 40 of the front plain bearing bush 34 is fixedly connected to the chassis 80 of the motor vehicle. A rubber filling 38 is provided between the outer hollow cylinder 36 and the inner hollow cylinder 40 of the front plain bearing bush 34 so that the front end of the leaf spring element 12 is virtually noiselessly pivotable about the front transverse axis 42 relative to the chassis.

FIG. 2 shows a schematic rear view of the longitudinal leaf spring device 10 according to FIG. 1 which is arranged on the left side of the axle 74, said rear view being shown in section along a plane which is transverse to the axle 74 of the motor vehicle.

As can be seen in FIG. 2, the longitudinal leaf spring device 10 has a bump stop unit 44 or bump stop assembly 44 having two separate elastic stop elements 46, 58. The bump stop unit 44 is arranged inwardly spaced from the coupling device 14 in the lateral (+Y−) direction. The stop elements 46, 58 are arranged vertically above one another and overlap only partially in the vertical direction. An upper stop element 46 of the two stop elements 46, 58 is fixedly connected to the chassis of the motor vehicle. A lower stop element 58 of the two stop elements 46, 58 is fixedly connected to the axle 74.

As shown in FIG. 2, the upper stop element 46 is formed substantially in the shape of an oblique truncated cone and the lower stop element 58 substantially has the shape of a diagonally cut circular cylinder. In further embodiments, other shapes are also contemplated.

The upper stop element 46 has a downwardly directed contact area 48. The lower stop element 58 has an upwardly directed contact area 60, which, in terms of its size, exceeds the size of the contact area 48 of the upper stop element 46 by greater than 60%. The contact area 48 of the upper stop element 46 and the contact area 60 of the lower stop element 58 each have a plurality of mutually corresponding form-locking elements 50, 62.

The mutually corresponding form-locking elements 50, 62 of the contact areas 48, 60 are formed in the shape of mutually matching series of stairs (or a series of steps), whereof the steps are aligned horizontally in a state (illustrated in FIG. 2) in which the longitudinal leaf spring device 10 is only loaded by the body load, wherein front edges of the steps extend transversely to the axle 74.

In the state of the longitudinal leaf spring device 10 which is illustrated in FIG. 2, the stop elements 46, 58 form a vertical clearance of a predetermined size between the contact areas 48, 60. The size of the vertical clearance can be between 10 and 20 mm, for example.

According to the known least-squares method, a planar virtual compensating area, referred to below as a mean contact area 52, can be associated with the downwardly directed contact area 48 of the upper stop element 46. In the same way, a mean contact area 64 can be associated with the upwardly directed contact area 60 of the lower stop element 58.

Perpendicular directions 54, 66, which, starting from a center point of the respective mean contact area 52, 64, are arranged perpendicularly to this latter, can be furthermore associated with the mean contact areas 52, 64 of the stop elements 46, 58.

As can be seen in FIG. 2, the perpendicular direction 54 to the mean contact area 52 of the upper stop element 46 forms an angle 56, other than zero, of between 10° and 40°, and in one example of 22°, with the vertical, which angle is directed outward from the vertical. The perpendicular direction 66 to the mean contact area 64 of the lower stop element 58 furthermore forms an angle 68, other than zero, of between 10° and 40°, and in one example of 22°, with the vertical, which angle is directed inward from the vertical.

Therefore, in terms of its value, the angle 56 formed by the perpendicular direction 54 to the mean contact area 52 of the upper stop element 46 with the vertical corresponds precisely to the angle 68 which is formed by the perpendicular direction 66 to the mean contact area 64 of the lower stop element 58 with the vertical.

When the vehicle is in a right-hand bend, a leftward deflection takes place, in which the upper stop element 46 and the lower stop element 58 move closer to one another and the vertical clearance of a predetermined size, which previously existed in the state in which the longitudinal leaf spring device 10 was only loaded by the body load, becomes smaller.

If a transverse acceleration when the vehicle is in the right-hand bend exceeds a predetermined value, then the contact area 48 of the upper stop element 46 and the contact area 60 of the lower stop element 58 move into mutual contact. In this case, the mutually corresponding form-locking elements 50 of the contact area 48 of the upper stop element 46 and the form-locking elements 62 of the contact area 60 of the lower stop element 58 form a plurality of form-locking connections.

The two stop elements 46, 58 are made entirely of synthetic rubber, preferably of chloroprene rubber, and therefore comprise a rubber-elastic material, in particular in the region of the mutually facing contact areas 48, 60. The contact area 48 of the upper stop element 46 and the contact area 60 of the lower stop element 58 form a friction pair with a coefficient of static friction which is greater than 0.8 and, in this specific embodiment, greater than 1.5.

As a result of the mutual contact of the contact areas 48, 60 of the upper stop element 46 and the lower stop element 58 and as a result of the identical angle 56, 68 of 22° between the mean contact areas 52, 64 and the vertical, a laterally acting transverse force 72 is also transferred in addition to a vertical force component 70 in the driving situation described. The transverse stability of the motor vehicle is increased considerably as a result of this newly provided capacity for the transfer of a laterally acting transverse force 72.

When the motor vehicle is in a left-hand bend, a rightward deflection takes place and the behavior of the longitudinal leaf spring device provided on the right side of the axle 74 of the motor vehicle corresponds inversely to the description above.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the invention.

What is claimed is:

1. A longitudinal leaf spring device for a suspension of a body of a motor vehicle, comprising:
   a leaf spring unit in an elongated form;
   a coupling device to mechanically couple the leaf spring unit to an axle of a motor vehicle; and
   at least one bump stop unit having upper and lower elastic stop elements for connection, in a manner arranged vertically above one another, to a chassis or to the axle, wherein perpendicular directions to a downwardly directed mean contact area of the upper stop element and to an upwardly directed mean contact area of the lower stop element each form an angle other than zero with a vertical axis, wherein the bump stop unit is arranged inwardly spaced from the coupling device, at least in a lateral direction.

2. The longitudinal leaf spring device as claimed in claim 1, wherein, in a state in which the longitudinal leaf spring device is only loaded by a load of the body of the motor vehicle, the upper and lower stop elements forming a vertical clearance of a predetermined size therebetween.

3. The longitudinal leaf spring device as claimed in claim 1, wherein the angles formed by the perpendicular directions to the mean contact area of the upper stop element and to the mean contact area of the lower stop element with the vertical axis are each between 10° and 40°; and
   wherein the angle formed by the perpendicular direction to the mean contact area of the lower stop element is directed inward and that formed by the perpendicular direction to the mean contact area of the upper stop element is directed outward.

4. The longitudinal leaf spring device as claimed in claim 1, wherein the angle formed by the perpendicular direction to the mean contact area of the upper stop element with the vertical axis substantially corresponds, in terms of its value, to the angle which is formed by the perpendicular direction to the mean contact area of the lower stop element with the vertical axis.

5. The longitudinal leaf spring device as claimed in claim 1, wherein at least one of the upper and lower stop elements comprises a rubber-elastic material, at least in a region of the mutually facing contact areas of the upper and lower stop elements.

6. The longitudinal leaf spring device as claimed in claim 1, wherein the contact area of the upper stop element and the contact area of the lower stop element form a friction pair with a coefficient of static friction of at least 0.8.

7. The longitudinal leaf spring device as claimed in claim 1, wherein the contact area of the upper stop element and the contact area of the lower stop element have mutually corresponding form-locking elements.

8. The longitudinal leaf spring device as claimed in claim 7, wherein the mutually corresponding form-locking elements are formed in the shape of mutually matching series of stairs with steps of each series of stairs being aligned horizontally in at least one operating state of the longitudinal leaf spring device, wherein front edges of the steps of each series of stairs extend transversely to the axle.

9. A bump stop assembly comprising:
   an upper elastic element to connect to a chassis, and having a downwardly directed mean contact area; and
   a lower elastic element to connect to an axle, and having an upwardly directed mean contact area;
   wherein a perpendicular direction to each of the downwardly and upwardly directed mean contact areas forms an acute angle with a vertical axis such that mutual contact therebetween results in a lateral force component; and
   wherein the downwardly directed mean contact area is laterally offset from and overlaps the upwardly directed mean contact area only partially in a vertical direction.

10. The bump stop assembly of claim 9 wherein mutual contact between the upwardly and downwardly directed mean contact areas results in a vertical force component.

11. The bump stop assembly of claim 9 wherein the upwardly directed mean contact area is greater than the downwardly directed mean contact area.

12. The bump stop assembly of claim 9 wherein the downwardly and upwardly directed mean contact areas are formed by mutually corresponding form-locking elements.

13. The bump stop assembly of claim 9 wherein each of the each of the downwardly and upwardly directed mean contact areas is formed by a stepped surface.

14. The bump stop assembly of claim 13 wherein each stepped surface has a series of steps aligned horizontally, and wherein front edges of the steps in each stepped surface extend transversely to the axle.

15. The bump stop assembly of claim 9 wherein the acute angle for each of the downwardly and upwardly directed mean contact areas is in a range of ten to forty degrees.

16. The bump stop assembly of claim 9 wherein the upper stop element comprises an oblique truncated cone; and
   wherein the lower stop element comprises a diagonally cut circular cylinder.

17. A bump stop assembly comprising:
   an upper elastic element to connect to a chassis, and having a downwardly directed mean contact area; and
   a lower elastic element to connect to an axle, and having an upwardly directed mean contact area;
   wherein a perpendicular direction to each of the downwardly and upwardly directed mean contact areas forms an acute angle with a vertical axis such that mutual contact therebetween results in a lateral force component;
   wherein the upper stop element comprises an oblique truncated cone; and
   wherein the lower stop element comprises a diagonally cut circular cylinder.

18. The longitudinal leaf spring device as claimed in claim 1, wherein the leaf spring unit is formed from fiber-plastic composite material.

* * * * *